US012381272B2

(12) United States Patent
Polakowski et al.

(10) Patent No.: US 12,381,272 B2
(45) Date of Patent: Aug. 5, 2025

(54) ENCLOSED BATTERY PACK CHARGER (71) Applicant: MILWAUKEE ELECTRIC TOOL CORPORATION, Brookfield, WI (US)

(72) Inventors: Matthew R. Polakowski, Greenfield, WI (US); Kyle C. Fassbender, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 224 days.

(21) Appl. No.: 18/192,260

(22) Filed: Mar. 29, 2023

(65) Prior Publication Data

US 2023/0231219 A1 Jul. 20, 2023

Related U.S. Application Data

(63) Continuation of application No. 17/962,742, filed on Oct. 10, 2022, now Pat. No. 11,811,038, which is a
(Continued)

(51) Int. Cl.
*H01M 10/635* (2014.01)
*H01M 10/6571* (2014.01)
*H01M 10/6572* (2014.01)

(52) U.S. Cl.
CPC ..... *H01M 10/635* (2015.04); *H01M 10/6571* (2015.04); *H01M 10/6572* (2015.04)

(58) Field of Classification Search
CPC ........... H01M 10/635; H01M 10/6571; H01M 10/6572
(Continued)

(56) References Cited

U.S. PATENT DOCUMENTS 3,733,836 A   5/1973  Corini
8,579,113 B2  11/2013 Baumgartner
(Continued)

FOREIGN PATENT DOCUMENTS

CN    106160068 A    11/2016
DE   102011086873 A1   5/2013
(Continued)

OTHER PUBLICATIONS

International Search Report and Written Opinion for Application No. PCT/US2020/015774 dated May 29, 2020 (9 pages).
(Continued)

*Primary Examiner* — James M Erwin
(74) *Attorney, Agent, or Firm* — Michael Best & Friedrich LLP (57) ABSTRACT

A temperature controlled enclosure that includes a temperature control device for controlling the temperature within an internal cavity of the temperature controlled enclosure. The temperature controlled enclosure also includes one or more charging ports for receiving and charging a battery pack. A controller within the temperature controlled enclosure controls the temperature within the internal cavity to a predetermined or desired temperature (e.g., 20° C.). When a battery pack is received in the one or more charging ports, the temperature of the battery pack can be determined. If, for example, the temperature of the battery pack is below 0° C., the battery pack is allowed to warm up inside the temperature controlled enclosure before the battery pack is charged.

20 Claims, 13 Drawing Sheets

Related U.S. Application Data continuation of application No. 17/673,391, filed on Feb. 16, 2022, now Pat. No. 11,605,850, which is a continuation of application No. 16/776,623, filed on Jan. 30, 2020, now Pat. No. 11,283,117.

(60) Provisional application No. 62/798,583, filed on Jan. 30, 2019.

(58) Field of Classification Search
USPC .......................................................... 429/62
See application file for complete search history.

(56) References Cited

U.S. PATENT DOCUMENTS

| | | |
|---|---|---|
| 9,153,978 B2 | 10/2015 | Reade et al. |
| 9,379,561 B2 | 6/2016 | Rejman |
| 9,748,794 B2 | 8/2017 | Rejman |
| 9,829,953 B2 | 11/2017 | Reade et al. |
| 10,027,188 B2 | 7/2018 | Rejman |
| 10,063,096 B2 | 8/2018 | Rejman et al. |
| 2005/0156564 A1 | 7/2005 | Krieger |
| 2006/0220620 A1 | 10/2006 | Aradachi et al. |
| 2012/0218027 A1 | 8/2012 | Ioannidis |
| 2013/0048647 A1 | 2/2013 | Farrar et al. |
| 2014/0266038 A1 | 9/2014 | Gibeau et al. |
| 2014/0328659 A1 | 11/2014 | Marji |
| 2015/0077042 A1 | 3/2015 | Seidel et al. |
| 2015/0077043 A1 | 3/2015 | Seidel et al. |
| 2015/0229011 A1 | 8/2015 | Gless |
| 2017/0259956 A1 | 9/2017 | Hori et al. |
| 2018/0009588 A1 | 1/2018 | Grogan |
| 2018/0062197 A1* | 3/2018 | Thiel ...................... H05K 1/181 |
| 2018/0062223 A1 | 3/2018 | Murata et al. |
| 2018/0069272 A1 | 3/2018 | Seo et al. |
| 2018/0231238 A1 | 8/2018 | Burch et al. |
| 2018/0366697 A1 | 12/2018 | Elfering et al. |

FOREIGN PATENT DOCUMENTS

| | | |
|---|---|---|
| EP | 3109574 A1 | 12/2016 |
| EP | 3402033 A1 | 11/2018 |
| WO | 2013014878 A1 | 1/2013 |
| WO | 2018129516 A2 | 7/2018 |

OTHER PUBLICATIONS

Extended European Search Report for Application No. 20748615.0 dated Jan. 12, 2023 (9 pages).

* cited by examiner

ENCLOSED BATTERY PACK CHARGER

RELATED APPLICATIONS

This application is a continuation of U.S. patent application Ser. No. 17/962,742, filed Oct. 10, 2022, which is a continuation of U.S. patent application Ser. No. 17/673,391, filed Feb. 16, 2022, now U.S. Pat. No. 11,605,850, which is a continuation of U.S. patent application Ser. No. 16/776,623, filed on Jan. 30, 2020, now U.S. Pat. No. 11,283,117, which claims the benefit of U.S. Provisional Patent Application No. 62/798,583, filed on Jan. 30, 2019, the entire content of each of which is hereby incorporated by reference.

SUMMARY

Embodiments described herein provide a temperature controlled enclosure that includes a temperature control device for controlling the temperature within an internal cavity of the temperature controlled enclosure. The temperature controlled enclosure also includes one or more charging ports for receiving and charging battery packs. A controller within the temperature controlled enclosure controls the temperature within the internal cavity to a predetermined or desired temperature (e.g., 20° C.). When a battery pack is received in the one or more charging ports, the temperature of the battery pack can be determined. If, for example, the temperature of the battery pack is below zero, the battery pack is allowed to warm up inside the temperature controlled enclosure before the battery pack is charged.

Temperature controlled enclosures described herein include a port configured to receive a battery pack, a temperature control device configured to modify an ambient temperature within the enclosure, and an electronic controller. The electronic controller is configured to determine whether the battery pack is received in the port, receive a signal from the battery pack, the signal including at least one of a temperature signal and a charge enable signal, and control the ambient temperature within the enclosure using the temperature control device based on the signal received from the battery pack.

Methods described herein for controlling a temperature within an enclosure include determining, using an electronic controller, when a battery pack is received in a port, receiving, using the electronic controller, a signal from the battery pack, the signal including at least one of a temperature signal and a charge enable signal, and controlling, using a temperature control device, the temperature within the enclosure based on the signal.

Temperature controlled enclosures described herein include a plurality of ports with each port of the plurality of ports being configured to receive a battery pack, a control device configured to modify an ambient temperature within the enclosure, and an electronic controller. The electronic controller is configured to determine whether the battery pack is received in a port of the plurality of ports, receive a signal from the battery pack, the signal including at least one of a temperature signal and a charge enable signal, and control the ambient temperature within the enclosure using the temperature control device based on the signal received from the battery pack.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

FIGS. 1-7 illustrate a temperature controlled enclosure 100 that includes a lower housing portion 105 and an upper housing portion 110. In some embodiments, the upper housing portion 110 is pivotable about one or more hinges such that the interior of the temperature controlled enclosure 100 can be accessed without completely removing the upper housing portion 110. The upper housing portion 110 is configured to engage the lower housing portion 105 to create a substantially air- and water-tight seal. Such a seal between the lower housing portion 105 and the upper housing portion 110 aides in preventing air inside the temperature controlled enclosure 100 from being affected by air outside of the temperature controlled enclosure 100.

The temperature controlled enclosure 100 also includes a power input terminal 115. In some embodiments, the power input terminal 115 is an AC power input terminal. In other embodiments, the power input terminal 115 is a DC power input terminal or includes a battery pack interface for receiving one or more battery packs. The upper housing portion 110 includes an interface 120 that is configured to allow the temperature controlled enclosure 100 to physically engage or mate with one or more additional devices that have a complimentary interfaces.

Figure 1:
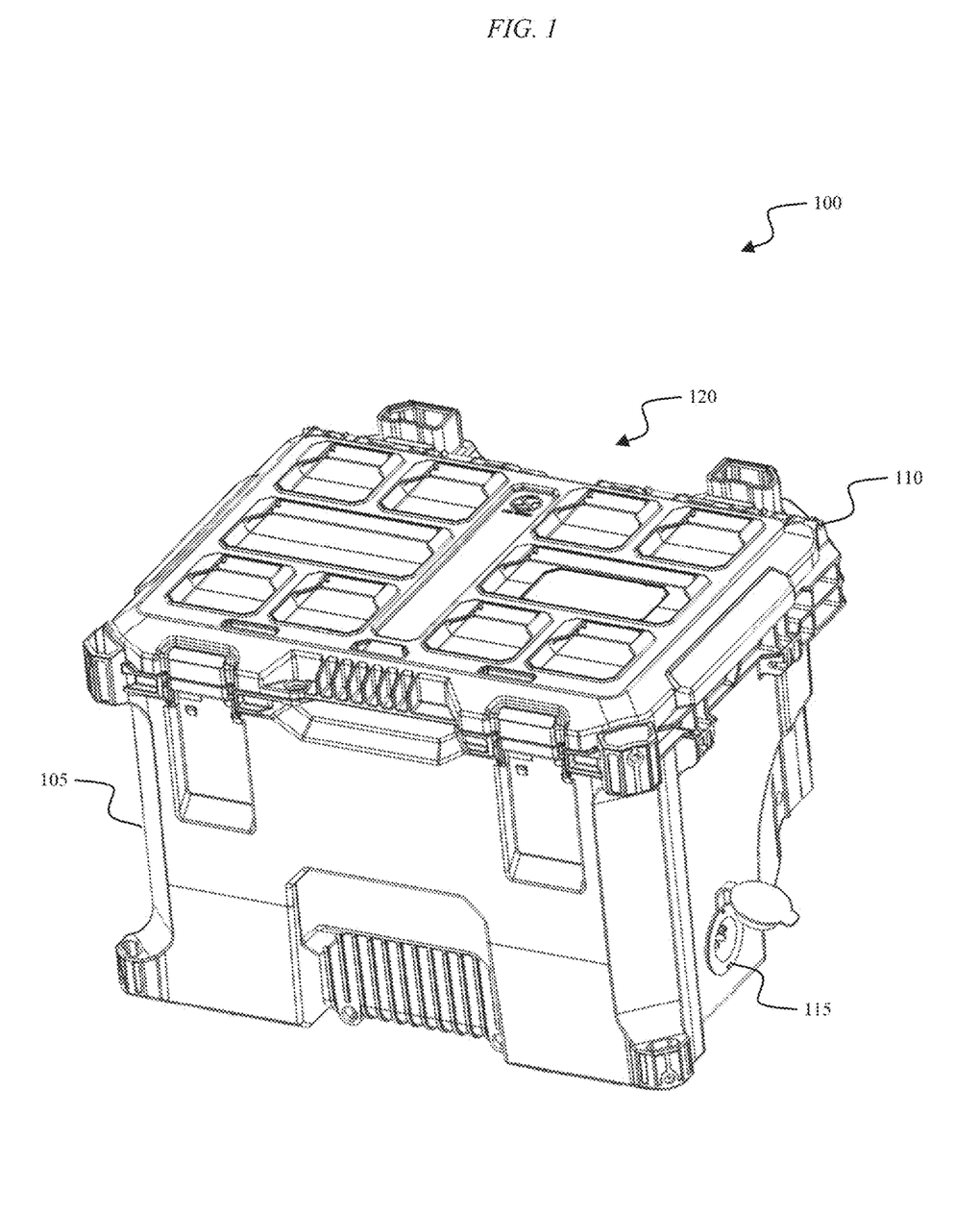
FIG. 1 is a perspective view of a temperature controlled enclosure, according to embodiments described herein.
Figure 2:
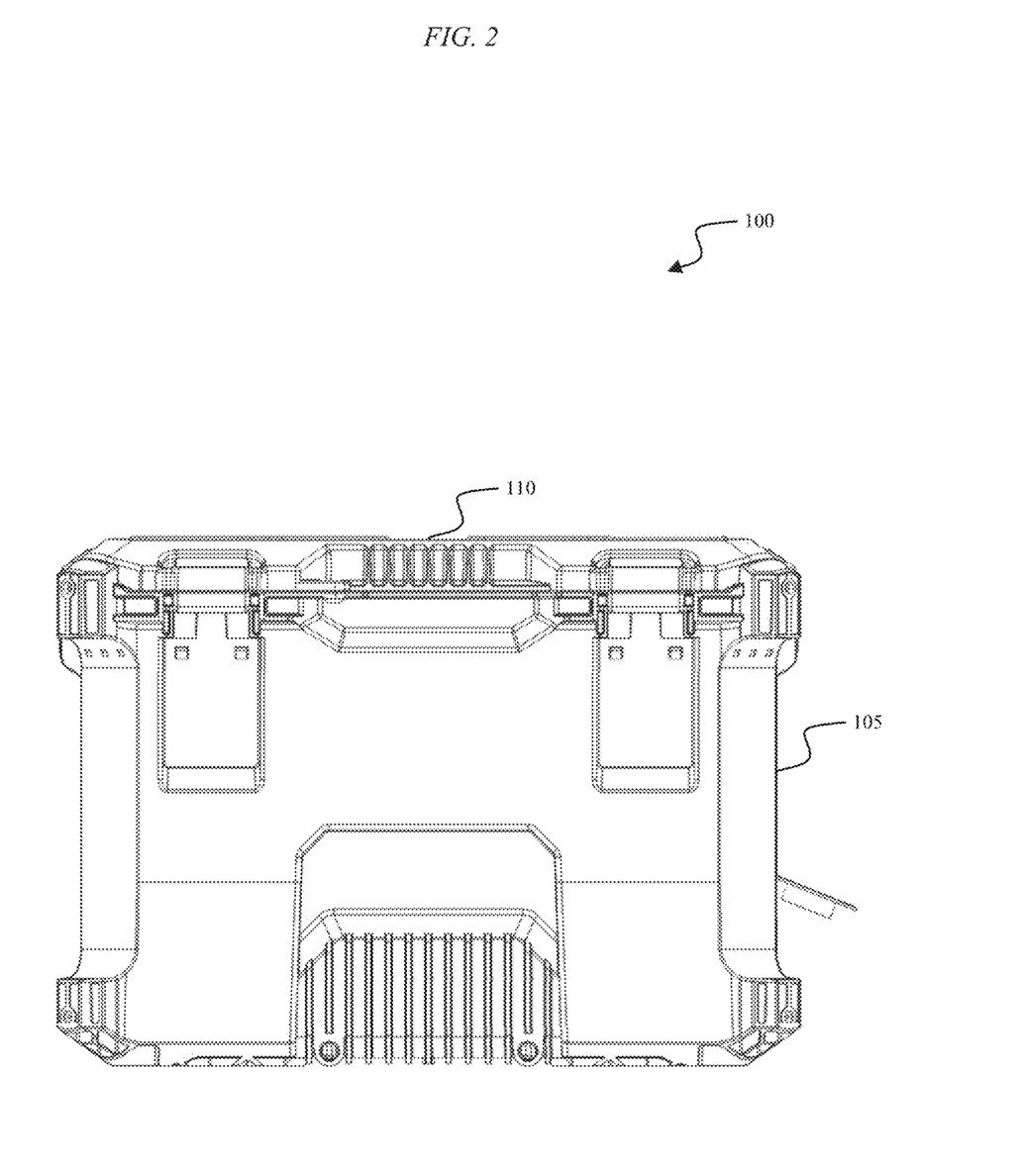
FIG. 2 is a front view of the temperature controlled enclosure of FIG. 1.
Figure 3:
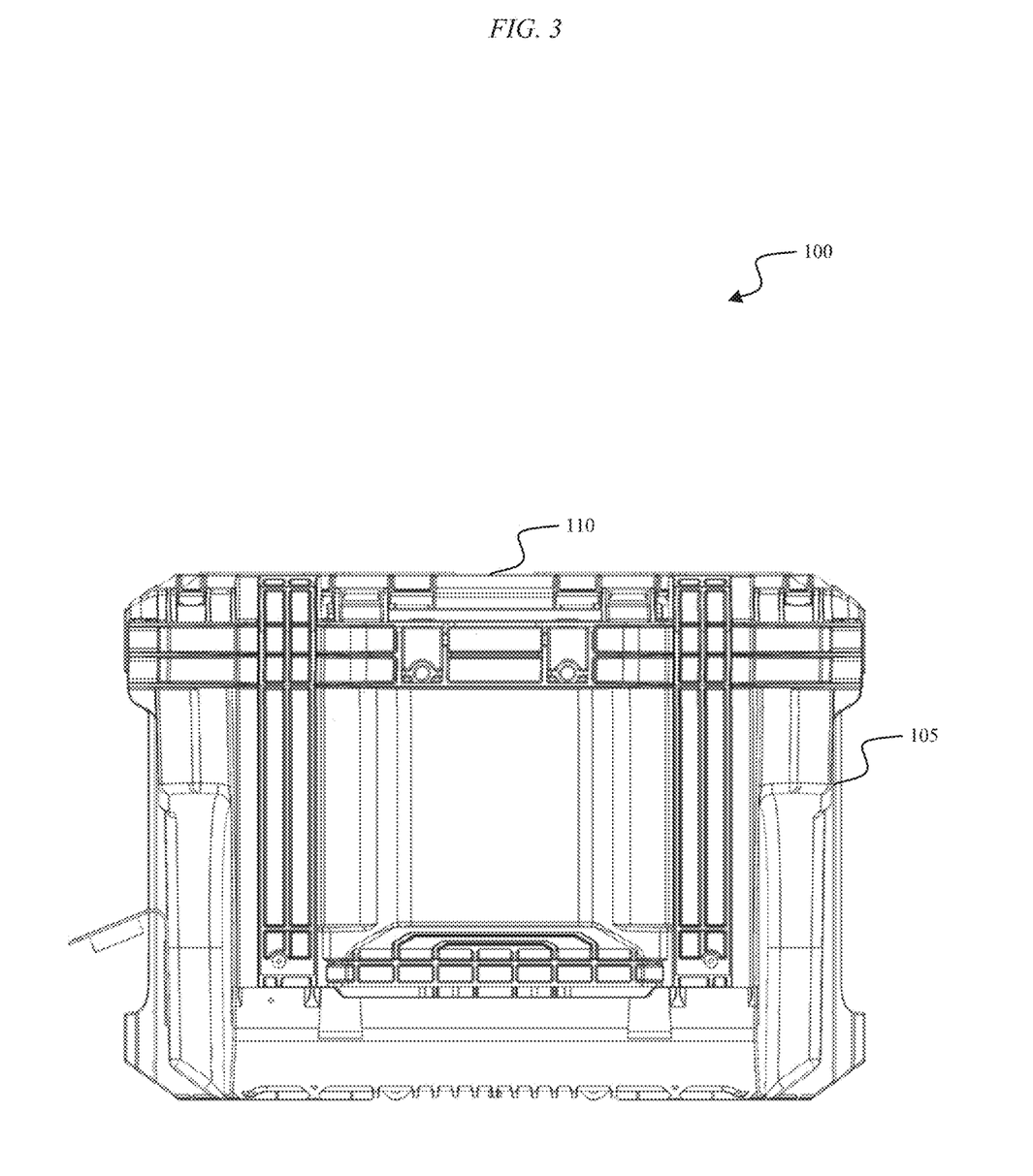
FIG. 3 is a rear view of the temperature controlled enclosure of FIG. 1.
Figure 4:
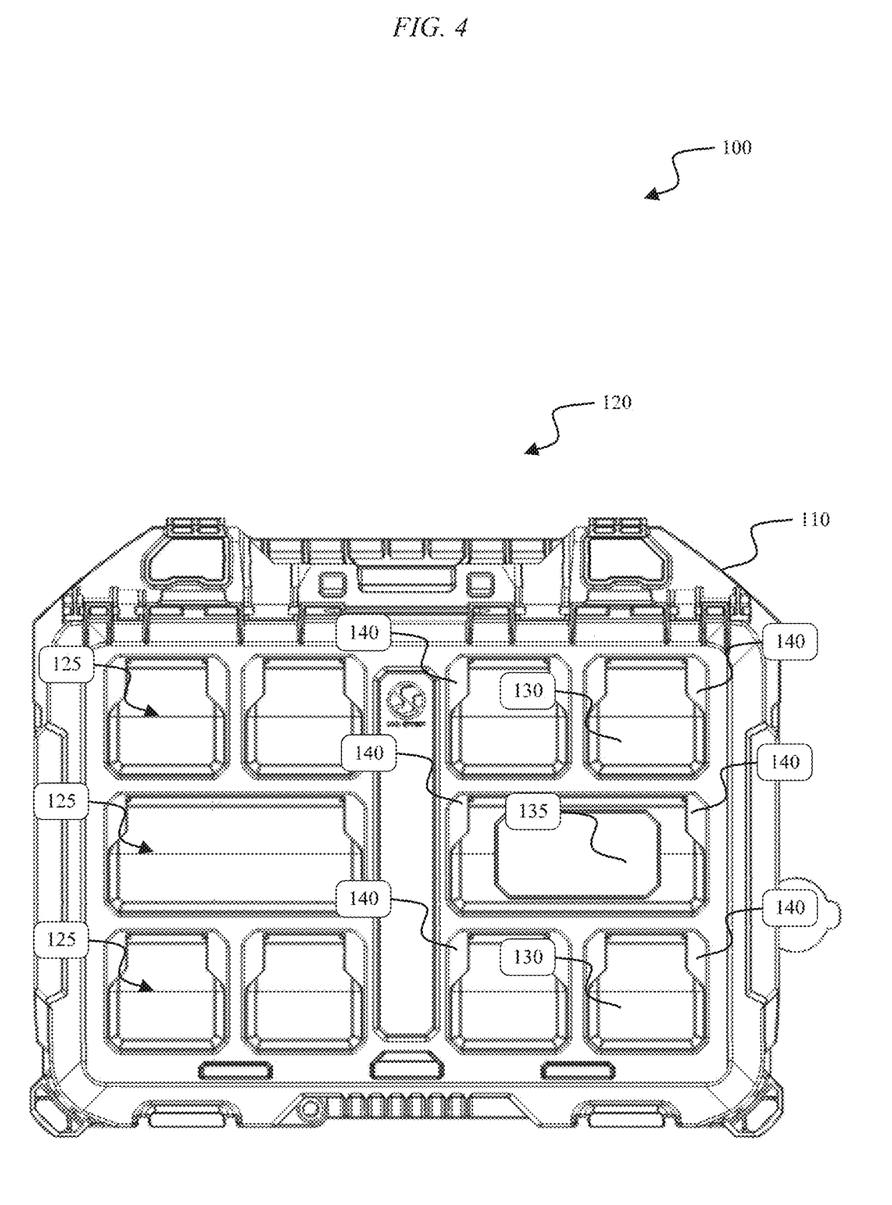
FIG. 4 is a top view of the temperature controlled enclosure of FIG. 1.
Figure 5:
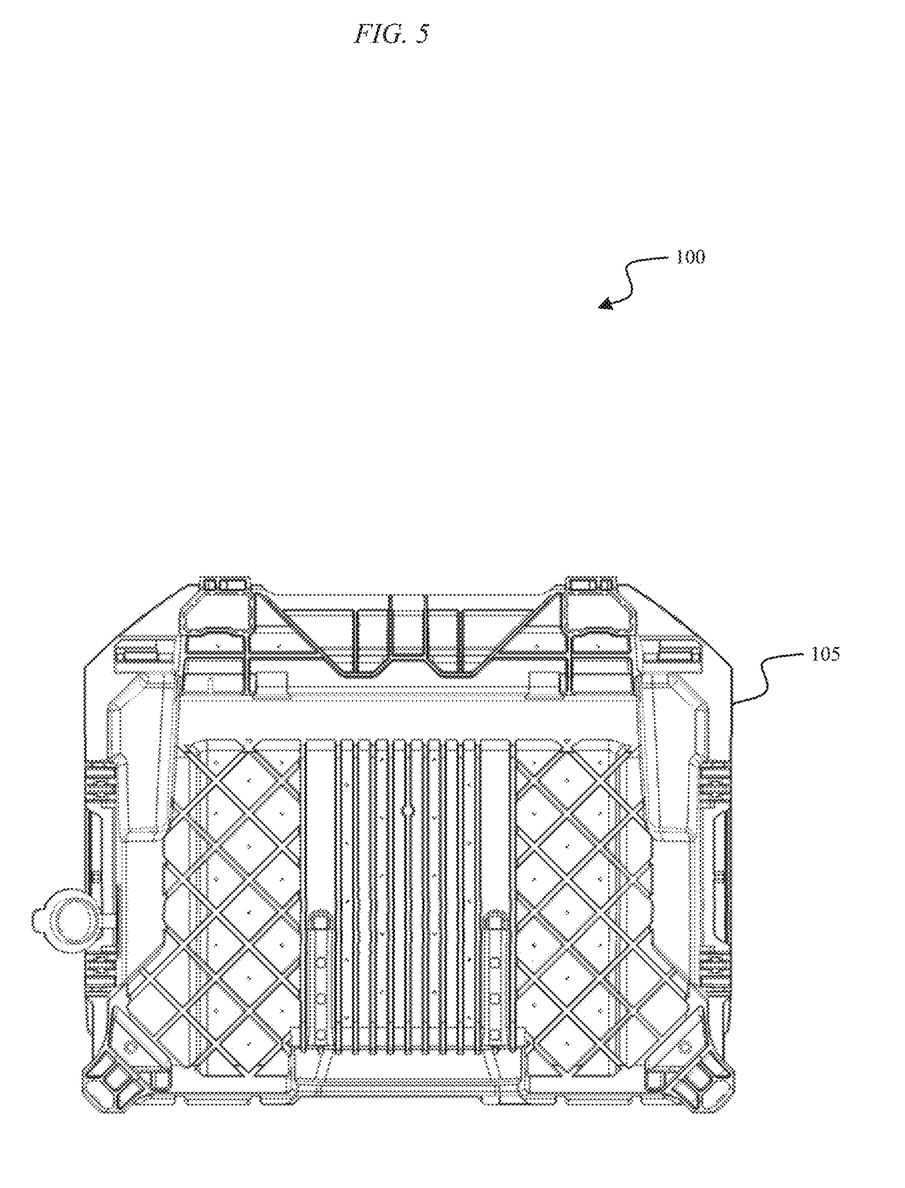
FIG. 5 is a bottom view of the temperature controlled enclosure of FIG. 1.
Figure 6:
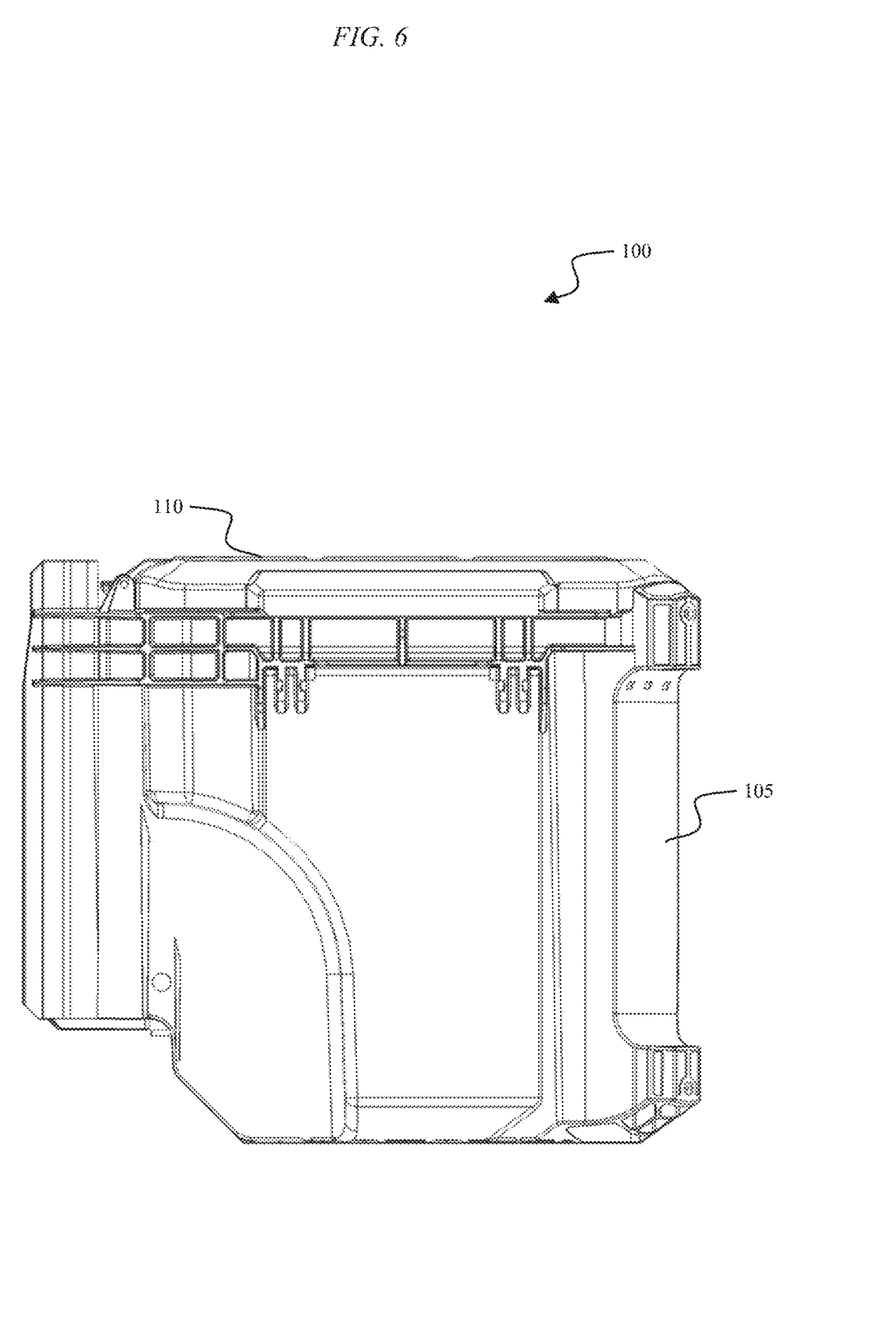
FIG. 6 is a left-side view of the temperature controlled enclosure of FIG. 1.
Figure 7:
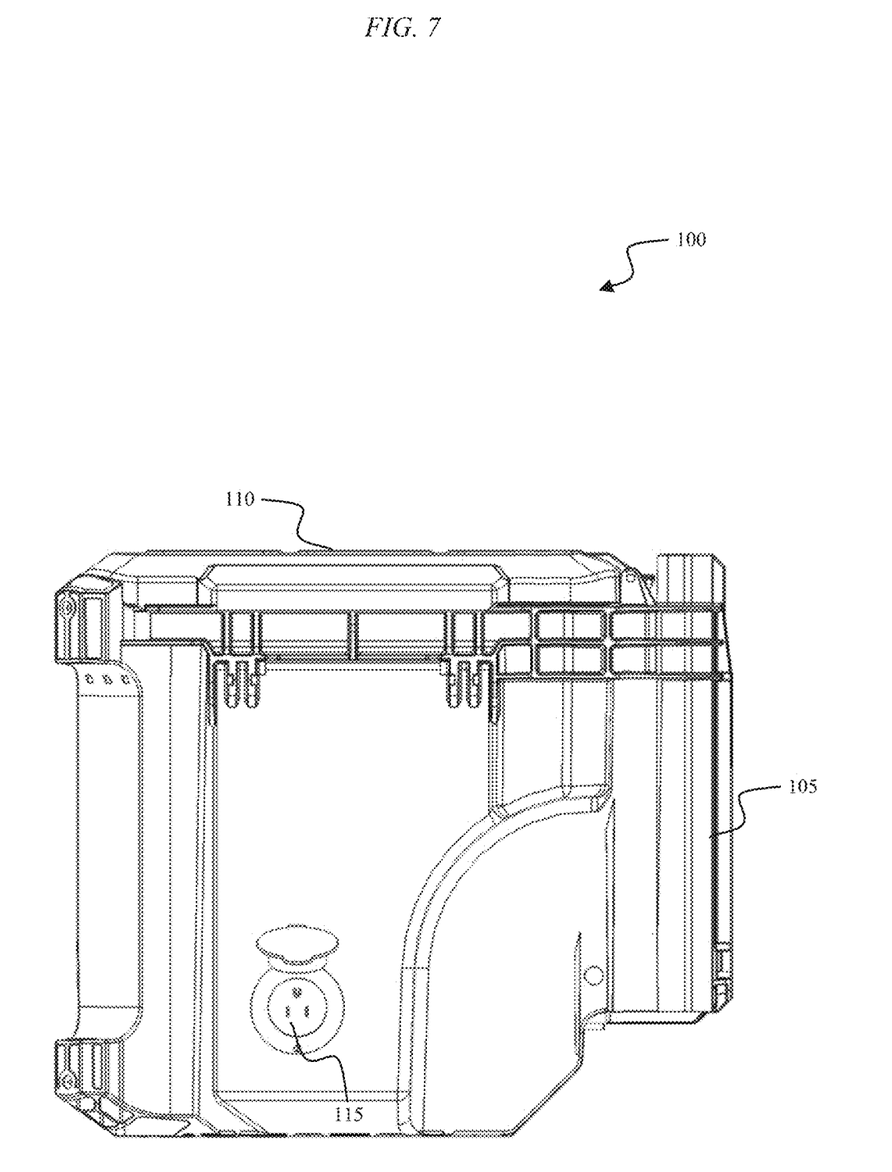
FIG. 7 is a right-side view of the temperature controlled enclosure of FIG. 1.
Figure 8:
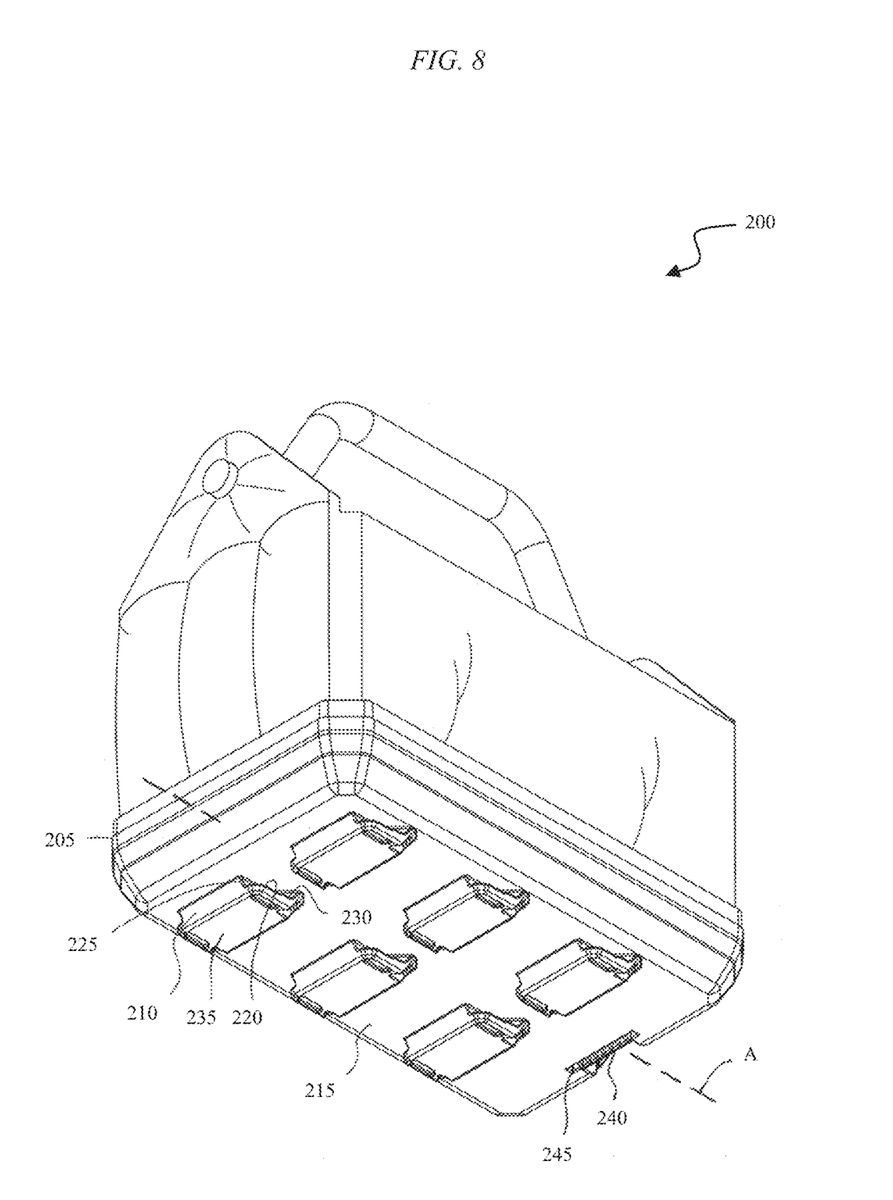
FIG. 8 is a perspective view of a device including an interface for mechanically engaging with the temperature controlled enclosure of FIG. 1, according to embodiments described herein.

With reference to FIG. 4, the interface 120 of the upper housing portion 110 includes a plurality of connection recesses 125 that receive and cooperate with projections from a complementary interface (see FIG. 8). The connection recesses 125 include two rows of two small recesses 130 and one row of large recess 135. In other embodiments, the upper housing portion 110 can include different numbers or patterns of connection recesses 125. An interference projection or wing 140 extends into each connection recess 125 on opposite sides of the connection recess 125 from one end of the connection recess 125. Each of the wings 140 has a length that extends approximately half the connection recess 125 to define a first portion of the connection recess 125 and a second portion opposite the wings 140, which remains open. In some embodiments, each of the wings 140 has a length that extends less than half the connection recess 125.

With reference to a device 200 (e.g., a component of a modular tool storage system) having a bottom member 205 as illustrated in FIG. 8, the second portion of each connection recess 125 is sized to receive a projection 210. When the projections 210 are received in the connection recesses 125, a bottom surface 215 of the bottom member 205 is arranged to contact and be supported by a top surface of the upper housing portion 110. In the illustrated embodiment, each projection 210 extends from the bottom surface 215 of the bottom member 205 and is configured to cooperate with a connection recess 125 and connect the device 200 to the temperature controlled enclosure 100. In the illustrated embodiment, each projection 210 is formed integrally with the bottom member 205. Each projection 210 has a channel 220 on each side of the projection 210 extending parallel to a longitudinal axis A of the bottom member 205. Each channel 220 has a front, open end 225 and a back, closed end 230 along the axis A. Each projection 210 has a planar surface 235 with a generally rectangular shape. In other embodiments, the planar surface 235 may be another shape (e.g., circular, triangular, etc.). In the illustrated embodiment, there are six projections 210 arranged in three rows of two along the axis A. In other embodiments, the device 200 includes more or fewer projections 210, and/or the projections 210 are arranged in different patterns. The projections 210 are arranged such that the device 200 can be supported on a surface by the projections 210 through contact with the planar surfaces 235. In some embodiments, the device 200 includes an interface portion 240 and a latch member 245 for engaging a locking aperture of the temperature controlled enclosure 100 and securing the device 200 to the temperature controlled enclosure 100.

Each of the wings 140 of the connection recesses 125 corresponds to and is configured to cooperate with a corresponding one of the channels 220 of the projection 210 received by the respective connection recess 125. In the disconnected position, the projections 210 are oriented within the connection recesses 125 such that the open ends 225 of the channels 220 are nearer to the wings 140 than the closed ends 230. Once in the disconnected position, the bottom member 205 may slide relative to the upper housing portion 110 parallel the longitudinal axis A in a first direction toward the wings 140 such that the wings 140 are received within the channels 220 in a second, interfaced or connected position. The wings 140 and the projections 210 engage within the connection recesses 125 to interface and connect the bottom member 205 with the upper housing portion 110 and prevent disconnection of the bottom member 205 from the upper housing portion 110, except in a second direction opposite the first direction and generally parallel to the longitudinal axis A. The wings 140 and the channels 220 engage one another perpendicular to the longitudinal axis A. In some embodiments, the upper housing portion 110 includes a locking aperture for inhibiting disconnection of the device 200 from the temperature controlled enclosure 100.

Figure 9:
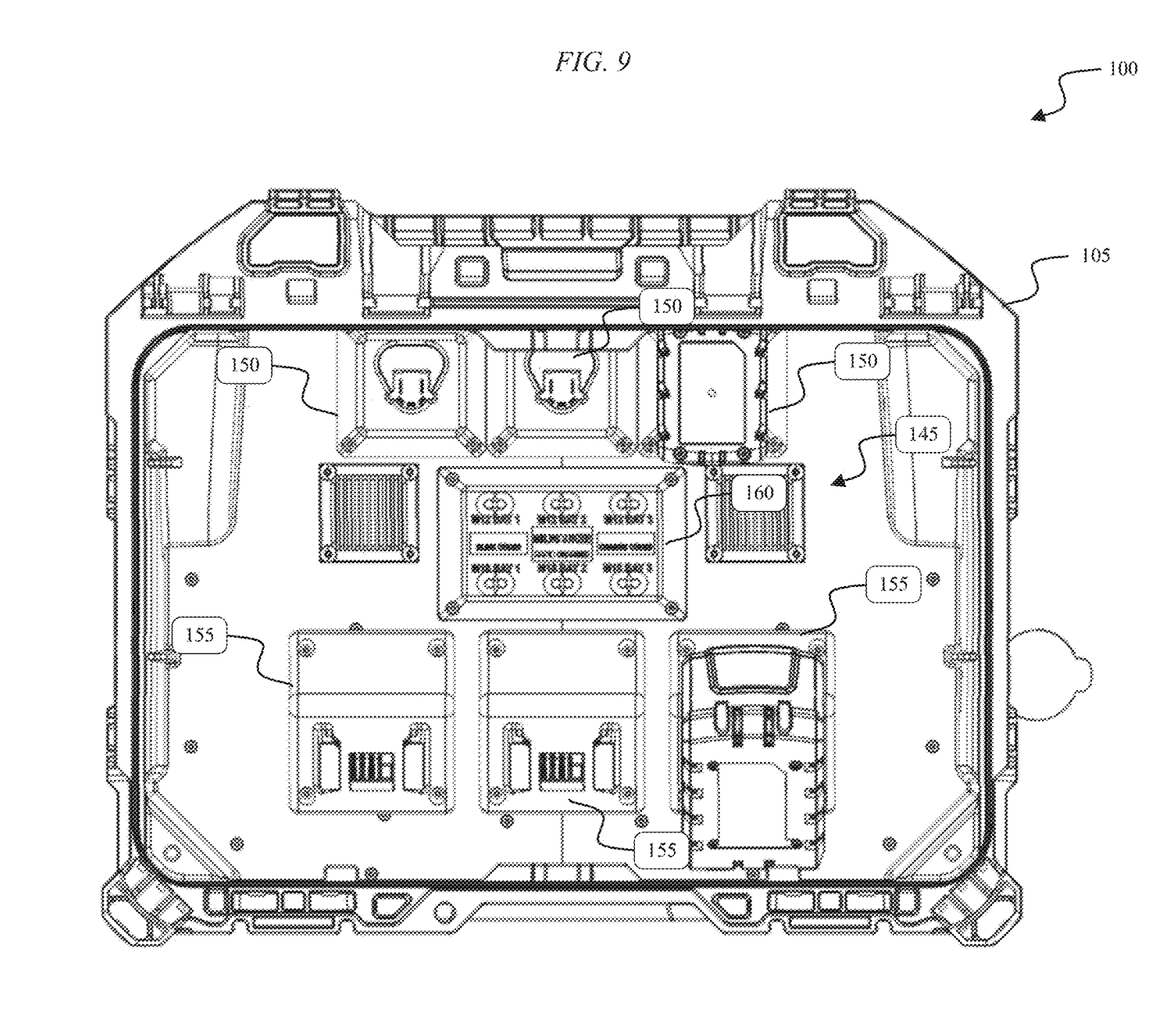
FIG. 9 is a top view of the temperature controlled enclosure of FIG. 1 with an upper housing portion removed, according to embodiments described herein.

FIG. 9 illustrates the temperature controlled enclosure 100 with the upper housing portion 110 removed. As shown in FIG. 9, the temperature controlled enclosure 100 includes an internal cavity or space 145. The internal cavity 145 includes one or more battery pack interfaces 150 (e.g., battery pack charging ports). The battery pack charging ports 150 correspond to charging ports for a first type of battery pack (e.g., a stem battery pack) including a first output voltage (e.g., 12V). The internal cavity 145 also includes one or more battery pack charging ports 155. The battery pack charging ports 155 correspond to charging ports for a second type of battery pack (e.g., a brick or slide-on battery pack) including a second output voltage (e.g., 18V). The internal cavity 145 also includes one or more indicators for providing a charging and/or temperature status of one or more battery packs connected to the charging ports 150, 155.

Figure 10:
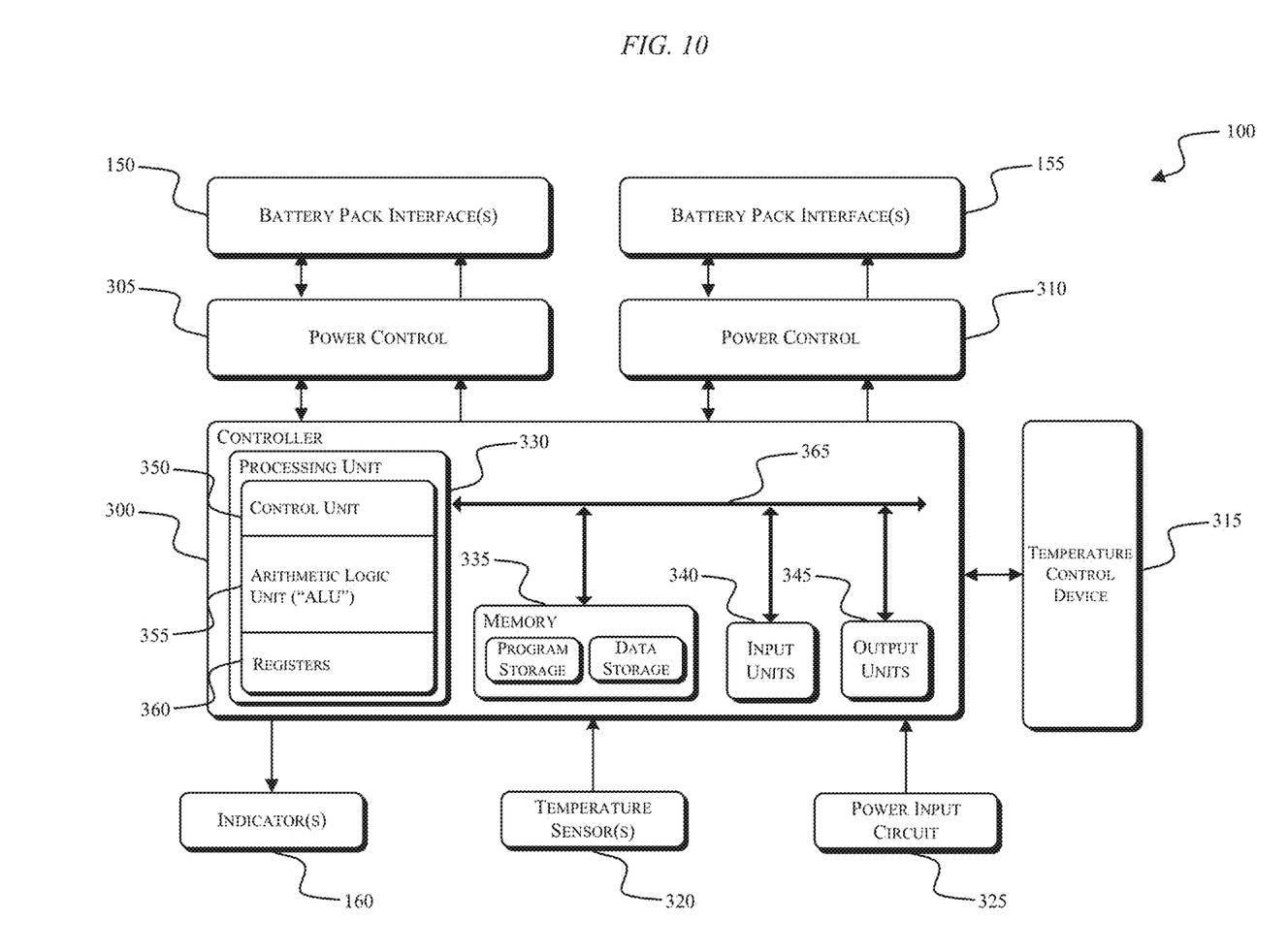
FIG. 10 is an electromechanical schematic diagram of a controller for the temperature controlled enclosure of FIG. 1, according to embodiments described herein.

A controller 300 for the temperature controlled enclosure 100 is illustrated in FIG. 10. The controller 300 is electrically and/or communicatively connected to a variety of modules or components of the temperature controlled enclosure 100. For example, the illustrated controller 300 is connected the indicators 160, the battery pack charging ports 150 and the battery pack charging ports 155 through a first power control module 305 and a second power control module 310, respectively, a temperature control device 315 (e.g., a forced air temperature control device), one or more temperature sensors 320 (e.g., thermistors for sensing ambient temperature, a temperature of a battery pack, a temperature of a charging port, etc.), and a power input circuit 325. The controller 300 includes combinations of hardware and software that are operable to, among other things, control the operation of the temperature controlled enclosure 100, activate the indicators 160 (e.g., one or more LEDs), receive signals from the one or more temperature sensors 320, control the temperature control device 315, control the power control modules 305, 310, etc. In some embodiments, the indicators 160 also include one or more indicators that are visible externally to the temperature controlled enclosure 100 (e.g., positioned on an external surface of the lower housing portion). Such indicators can provide an indication of an internal ambient temperature of the temperature controlled enclosure 100 or a battery pack charging status.

The controller 300 includes a plurality of electrical and electronic components that provide power, operational control, and protection to the components and modules within the controller 300 and/or temperature controlled enclosure 100. For example, the controller 300 includes, among other things, a processing unit 330 (e.g., a microprocessor, electronic controller, electronic processor, a microcontroller, or another suitable programmable device), a memory 335, input units 340, and output units 345. The processing unit 330 includes, among other things, a control unit 350, an arithmetic logic unit ("ALU") 325, and a plurality of registers 360 (shown as a group of registers in FIG. 10), and is implemented using a known computer architecture (e.g., a modified Harvard architecture, a von Neumann architecture, etc.). The processing unit 330, the memory 335, the input units 340, and the output units 345, as well as the various modules connected to the controller 300 are connected by one or more control and/or data buses (e.g., common bus 365). The control and/or data buses are shown generally in FIG. 10 for illustrative purposes. The use of one or more control and/or data buses for the interconnection between and communication among the various modules and components would be known to a person skilled in the art in view of the invention described herein.

The memory 335 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 330 is connected to the memory 335 and executes software instructions that are capable of being stored in a RAM of the memory 335 (e.g., during execution), a ROM of the memory 335 (e.g., on a generally permanent basis), or another non-transitory computer readable medium such as another memory or a disc. Software included in the implementation of the temperature controlled enclosure 100 can be stored in the memory 335 of the controller 300. The software includes, for example, firmware, one or more applications, program data, filters, rules, one or more program modules, and other executable instructions. The controller 300 is configured to retrieve from the memory 335 and execute, among other things, instructions related to the control processes and methods described herein. In other constructions, the controller 300 includes additional, fewer, or different components.

As shown in FIG. 9, the battery pack charging ports 150, 155 include a combination of mechanical components and electrical components configured to and operable for interfacing (e.g., mechanically, electrically, and communicatively connecting) a battery pack with the temperature controlled enclosure 100. For example, the battery pack charging ports 150, 155 are configured to receive power from the power control modules 305, 310, respectively, via power lines between the power control modules 305, 310 and the battery pack charging ports 150, 155. The battery pack charging ports 150, 155 are also configured to communicatively connect to the power control modules 305, 310 via separate communications lines.

The one or more temperature sensors 320 include one or more thermistors or other temperature sensors that are operable to monitor a temperature within the temperature controlled enclosure 100 (e.g., an ambient temperature in the internal cavity 145), a temperature of one or more battery packs, a temperature of one or more charging ports 150, 155, etc. The one or more temperature sensors 320 provide output signals (e.g., temperature output signals) to the controller 300. Based on these control signals, the controller 300 determines the ambient air temperature within the temperature controlled enclosure 100, the temperature of one or more battery packs, the temperature of one or more charging ports 150, 155, etc. The controller 300 is configured to control the operation of the temperature control device 315 to regulate the temperature of the internal cavity 145 of the temperature controlled enclosure 100 and charge one or more battery packs.

The power input circuit 325 includes the power input terminal 115. As previously described, the temperature controlled enclosure 100 can be powered by AC power (e.g., AC mains power) or DC power (e.g., a battery pack). In some embodiments, a DC power source (e.g., a battery pack) powers an inverter which then provides AC power to the power input terminal 115. In some embodiments, the temperature controlled enclosure 100 is configured to operate using approximately 150 Watts of power. For example, the temperature controlled enclosure 100 using 150 Watts of power is able to maintain a predetermined or desired ambient temperature in the internal cavity 145 of the temperature controlled enclosure 100 when an ambient air temperature external to the temperature controlled enclosure 100 is approximately minus 20° C. In some embodiments, the predetermined or desirable ambient temperature in the internal cavity 145 of the temperature controlled enclosure 100 is between approximately 20° C. and approximately 30° C. In such a configuration, the temperature controlled enclosure 100 is operable to raise the temperature of a battery pack that is at a temperature of minus 20° C. to 0° C. in approximately ninety minutes. In some embodiments, the temperature controlled enclosure 100 also includes a burst mode in which an ambient temperature of the internal cavity 145 is increased to approximately 50° C. and the temperature of any battery packs within the temperature controlled enclosure 100 is increased more quickly. In such embodiments, the temperature controlled enclosure 100 is configured to operate using approximately 265 Watts of power.

Figure 11:
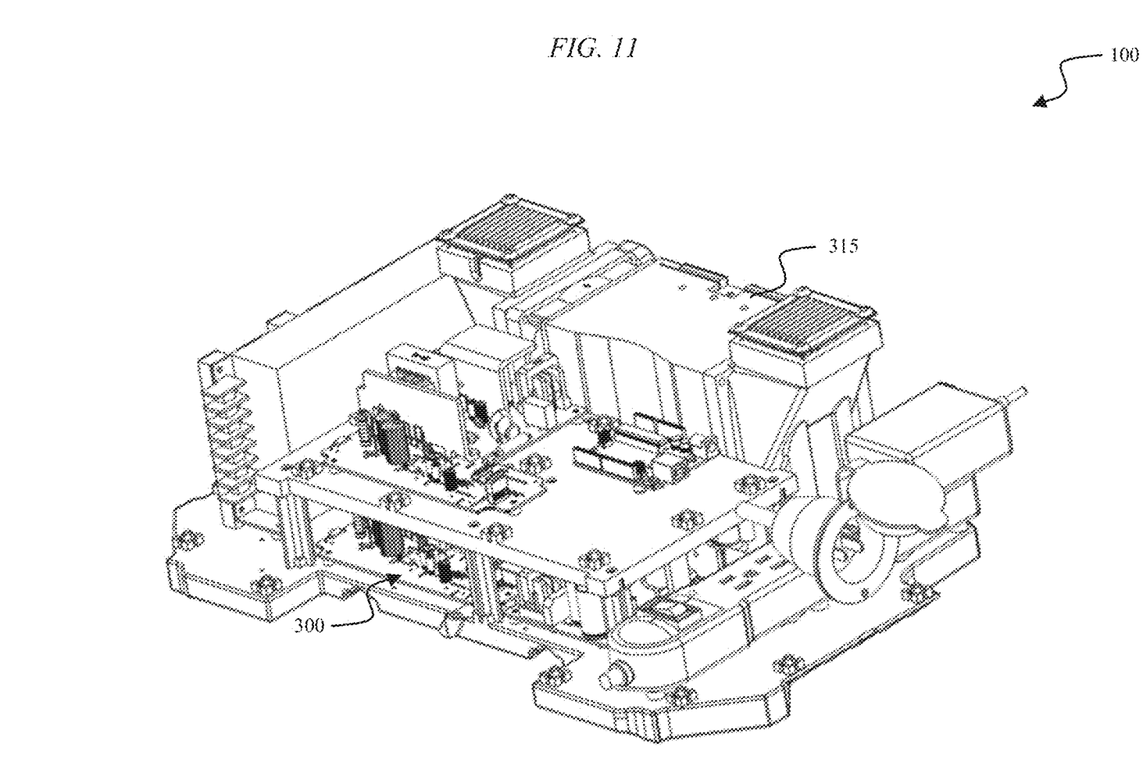
FIG. 11 illustrates a temperature control device for the temperature controlled enclosure of FIG. 1, according to embodiments described herein.

FIG. 11. illustrates an internal portion of the temperature controlled enclosure 100, according to embodiments described herein. The internal portion of the temperature controlled enclosure 100 includes, among other things, the controller 300 and the temperature control device 315. In the illustrated embodiment, the temperature control device 315 is a thermoelectric cooling device, such as a Peltier device. The temperature control device 315 is configured to regulate the temperature of the temperature controlled enclosure 100. The temperature control device 315 is capable of either generating heat (i.e., to increase or maintain a temperature) or absorb heat (i.e., to decrease or maintain a temperature). In some embodiments, the temperature control device 315 can also include a fan to assist in circulating heated or cooled air. In some embodiments, the temperature control device 315 includes a resistive heating element and a fan or another forced air heating system. In such embodiments, heat generated by the resistive heating element is circulated within the temperature controlled enclosure 100 using the fan.

Figure 12:
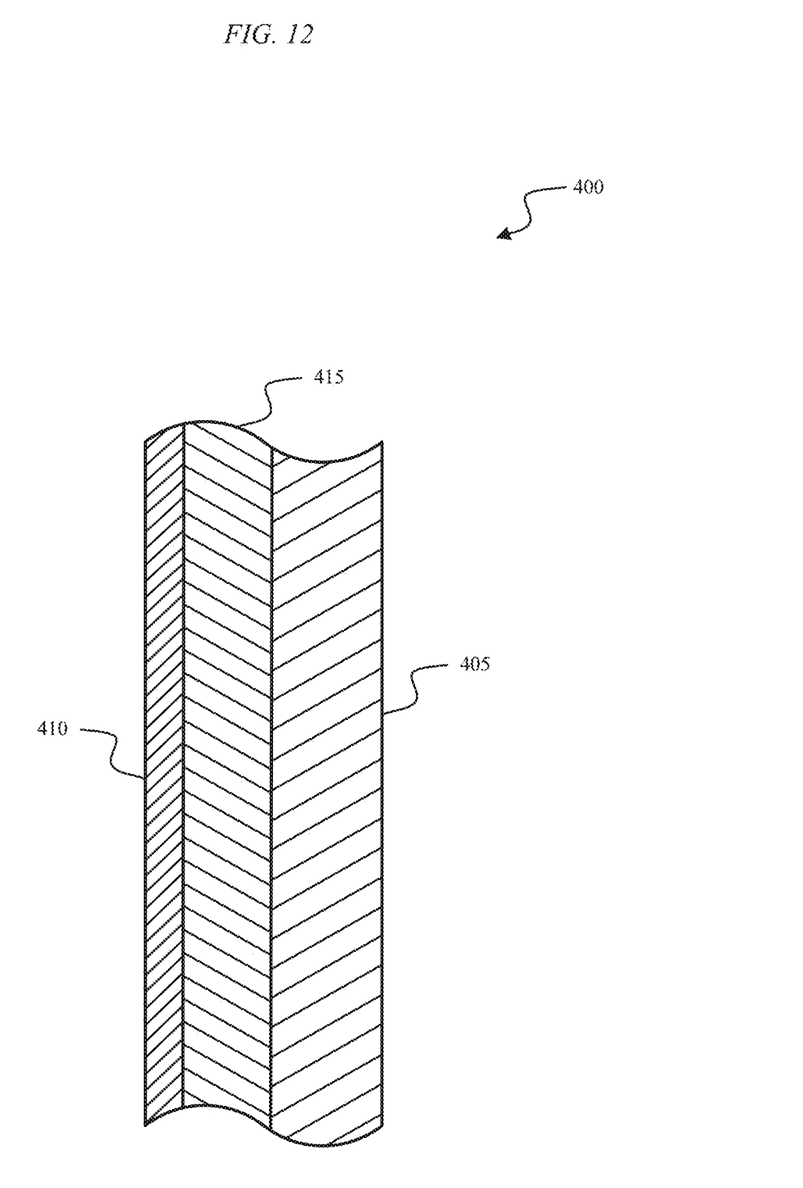
FIG. 12 is a partial cross-sectional view of a wall of a housing of the temperature controlled enclosure of FIG. 1, according to embodiments described herein.

To increase the efficiency of the temperature controlled enclosure 100, the temperature controlled enclosure 100 can also be insulated. FIG. 12 illustrates a partial cross-section 400 of part of the lower housing portion 105 of the temperature controlled enclosure 100. The partial cross-section 400 includes three layers of materials. A first insulating layer of material 405 corresponds to an outer housing material and is made of a plastic, such as polypropylene, high-impact polystyrene, or another similar material. The first layer of material 405 has a thermal resistance ("R") value of approximately 0.025. A second insulating layer of material 410 corresponds to an inner material layer for the internal cavity 145 of the temperature controlled enclosure 100. The second layer of material 410 is made of reflective insulation and has an R-value of between approximately 1.0 and 1.5. In some embodiments, a third insulating layer of material 415 is placed between the first layer of material 405 and the second layer of material 410. The third layer of material 415 is another insulating material that further prevents conduction of heat through the temperature controlled enclosure 100 and increase an overall R-value of the temperature controlled enclosure 100. In some embodiments, the R-value of the temperature controlled enclosure 100 is approximately 1.25-1.3. In other embodiments, the R-value for the temperature controlled enclosure 100 is in the range of 1.0-2.0.

Figure 13:
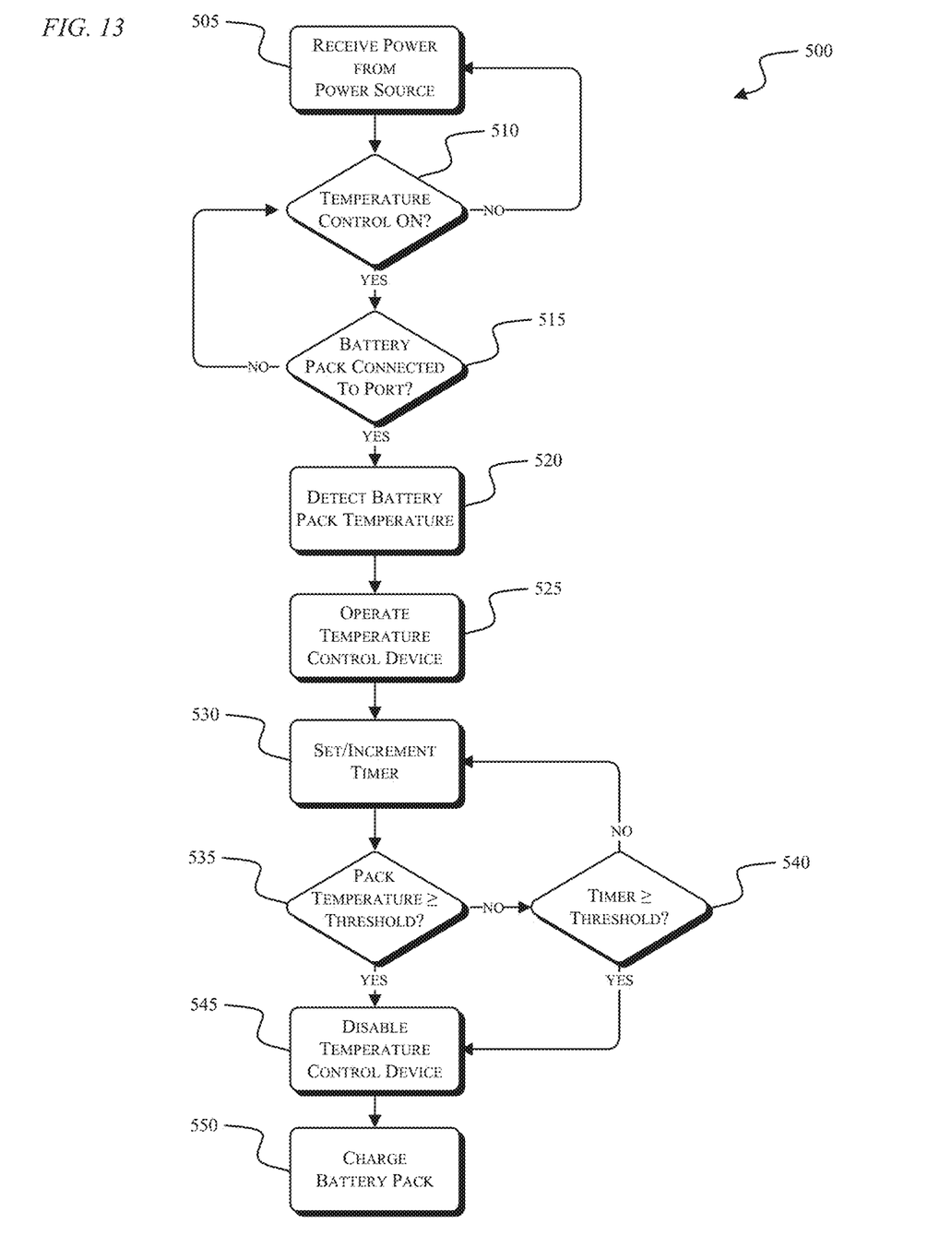
FIG. 13 is a process for controlling the temperature controlled enclosure of FIG. 1, according to embodiments described herein.

FIG. 13 is a process 500 for controlling the temperature controlled enclosure 100, according to embodiments described herein. The steps of the process 500 are shown for illustrative purposes. The process 500 can perform one of more of the steps in an order different than that shown in FIG. 13, or one or more steps of the process 500 can be removed from the process 500. The process 500 begins with the temperature controlled enclosure 100 receiving power from a power source (e.g., through the power input terminal 115) (STEP 505). At step 510, the controller 300 determines whether temperature control is ON or enabled. In some embodiments, a user manually turns temperature control ON (e.g., using a temperature control switch). In other embodiments, temperature control is automatically turned ON when the temperature controlled enclosure 100 receives power. If temperature control is OFF, the process waits for temperature control to be turned ON at STEP 510. If, at STEP 510, temperature control is ON, the controller 300 determines whether a battery pack is connected to a charging port within the temperature controlled enclosure 100 (STEP 515). If no battery pack is connected to a charging port, the process 500 returns to STEP 510. If a battery pack is connected to a charging port, the controller 300 detects the temperature of the battery pack (STEP 520). The controller 300 determines the temperature of the battery pack using a temperature sensor (e.g., a thermistor) in proximity to battery pack. In some embodiments, if the battery pack is capable of communication, the battery pack is configured to communicate the battery pack temperature (e.g., a temperature signal) to the controller 300. In some embodiments, the battery pack transmits a charge enable signal to the controller 300. The charge enable signal is configured to indicate the battery pack is, for example, within an acceptable temperature range for charging. In some embodiments, the process 500 does not include determining whether a battery pack is connected to a charging port at STEP 515 or determine a battery pack temperature at STEP 520 (i.e., the temperature controlled enclosure 100 independently regulates the ambient temperature of the internal cavity 145).

After STEP 520, the controller 300 operates the temperature control device 315 to control the ambient temperature in the internal cavity 145 of the temperature controlled enclosure 100 (STEP 525). When the temperature control device 315 is operated, the controller 300 can set a timer such that the temperature control device 315 is operated for a predetermined or desired amount of time (STEP 530). After the timer is set at STEP 530, the controller 300 determines if the temperature of the battery pack is greater than or equal to a temperature threshold value (e.g., 0° C.) (STEP 535). If the battery pack temperature is not greater than or equal to the temperature threshold value, the controller 300 compares the timer to a timer threshold value (e.g., 90 minutes) (STEP 540). If the timer is not greater than or equal to the timer threshold value, the process 500 returns to step 530. If, at STEP 535, the battery pack temperature is greater than or equal to the temperature threshold value, or, at STEP 540, the timer is greater than or equal to the timer threshold value, the process 500 proceeds to STEP 545 where the temperature control device 315 is disabled, and the battery pack is charged (STEP 550). In some embodiments, the temperature control device 315 is not disable at STEP 545 and continues to be operated when a battery pack is being charged.

Thus, embodiments described herein provide, among other things, a temperature controlled enclosure for charging one or more battery packs.

What is claimed is:

1. An enclosure for charging a battery pack, the enclosure comprising:
   an upper housing portion;
   a lower housing portion coupled to the upper housing portion via one or more hinges;
   an internal cavity within the enclosure, the internal cavity including a battery pack interface configured to receive the battery pack and provide charging current to the battery pack;
   an indicator configured to provide an indication of a charging status of the battery pack;
   a temperature control device; and
   an electronic controller configured to:
      determine whether the battery pack is received by the battery pack interface; and
      automatically operate, in response to the battery pack being received by the battery pack interface, the temperature control device.

2. The enclosure of claim 1, further comprising:
   a power input terminal configured to receive power from an alternating current (AC) power source.

3. The enclosure of claim 1, wherein the temperature control device includes a fan.

4. The enclosure of claim 3, wherein the fan is configured to provide cooling air.

5. The enclosure of claim 1, further comprising:
   a second battery pack interface configured to receive a second battery pack and provide charging current to the second battery pack.

6. The enclosure of claim 1, wherein the upper housing portion and the lower housing portion are at least partially made of a plastic material.

7. The enclosure of claim 6, wherein the plastic material is polypropylene.

8. The enclosure of claim 1, wherein the electronic controller is further configured to:
   determine whether a temperature control switch is set to ON; and
   operate, when both the temperature control switch is set to ON and the battery pack is received by the battery pack interface, the temperature control device.

9. The enclosure of claim 1, wherein the upper housing portion includes a recess configured to receive a projection from a complementary interface of a modular tool storage system.

10. The enclosure of claim 9, wherein the recess includes a wing extending partially across the recess.

11. The enclosure of claim 1, wherein the lower housing portion includes a projection extending from a bottom surface of the lower housing portion, the projection configured to be received by a recess of a complementary interface of a modulator tool storage system.

12. An enclosure for charging a plurality of battery packs, the enclosure comprising:
- an upper housing portion;
- a lower housing portion coupled to the upper housing portion via one or more hinges;
- an internal cavity within the enclosure, the internal cavity including a plurality of battery pack interfaces, each of the plurality of battery pack interface configured to receive a battery pack and configured to provide a charging current to the battery pack;
- a plurality of indicators, each indicator associated with a battery pack interface, each indicator configured to provide an indication of a charging status of the battery pack received by the respective battery pack interface;
- a temperature control device; and
- an electronic controller configured to:
  - determine whether the battery pack is received by one of the plurality of battery pack interfaces; and
  - automatically operate, in response to the battery pack being received by one of the plurality of battery pack interfaces, the temperature control device.

13. The enclosure of claim 12, further comprising a power input terminal configured to receive power from an alternating current (AC) power source.

14. The enclosure of claim 12, wherein the temperature control device includes a fan.

15. The enclosure of claim 12, wherein the upper housing portion and the lower housing portion are at least partially made of a plastic material.

16. The enclosure of claim 15, wherein the plastic material is polypropylene.

17. The enclosure of claim 12, wherein the electronic controller is further configured to:
- receive a charge enable signal from the battery pack received by one of the plurality of battery pack interfaces; and
- charge, in response to the charge enable signal, the battery pack.

18. The enclosure of claim 12, wherein the upper housing portion includes a first recess configured to receive a first projection from a first complementary interface of a modular tool storage system.

19. The enclosure of claim 18, wherein the lower housing portion includes a second projection extending from a bottom surface of the lower housing portion, the second projection configured to be received by a second recess of a second complementary interface of the modulator tool storage system.

20. The enclosure of claim 12, wherein the upper housing portion is configured to engage the lower housing portion to create a water-tight seal between the upper housing portion and the lower housing portion.

* * * * *